US005648764A

United States Patent [19]

Nose et al.

[11] Patent Number: 5,648,764

[45] Date of Patent: Jul. 15, 1997

[54] APPARATUS FOR REMOTELY CONTROLLING A DOOR LOCKING STATE AND THEFT PREVENTION ALARM STATE OF AN AUTOMOBILE

[75] Inventors: Shinji Nose, Kobe; Masahiko Enoki, Takasago, both of Japan

[73] Assignee: Fujitsu Ten Limited, Kobe, Japan

[21] Appl. No.: 921,618

[22] Filed: Jul. 31, 1992

Related U.S. Application Data

[63] Continuation of Ser. No. 566,231, Aug. 9, 1990, abandoned.

[30] Foreign Application Priority Data

Aug. 9, 1989 [JP] Japan .................................... 1-207312
Aug. 9, 1989 [JP] Japan .................................... 1-207313

[51] Int. Cl.[6] ........................................ H04Q 9/00

[52] U.S. Cl. ................................ 340/825.32; 340/825.31; 340/825.69; 340/426

[58] Field of Search ......................... 340/825.32, 825.31, 340/825.69, 825.72, 426, 825.54; 307/10.2, 10.5; 361/172

[56] References Cited

U.S. PATENT DOCUMENTS

| | | | |
|---|---|---|---|
| 4,143,368 | 3/1979 | Route et al. | 340/426 |
| 4,422,071 | 12/1983 | de Graaf | 340/825.44 |
| 4,525,713 | 6/1985 | Barletla et al. | 340/825.54 |
| 4,573,046 | 2/1986 | Pinnow | 340/825.31 |
| 4,663,626 | 5/1987 | Smith | 340/825.72 |
| 4,761,644 | 8/1988 | Kawai et al. | 340/825.31 |
| 4,881,148 | 11/1989 | Lambropoulos et al. | 307/10.2 |
| 4,884,055 | 11/1989 | Memmola | 340/426 |

FOREIGN PATENT DOCUMENTS

| | | |
|---|---|---|
| 59-160399 | 9/1959 | Japan . |
| 59-224939 | 12/1984 | Japan . |

*Primary Examiner*—Edwin C. Holloway, III
*Attorney, Agent, or Firm*—Wenderoth, Lind & Ponack

[57] ABSTRACT

An apparatus remotely controls, for example, door locking/unlocking and alarm activation of an automobile. A transmitting device transmits communication data, which includes synchronization data and identification data. The communication data is received by the control apparatus in which the identification data included in the received communication data is compared with already stored data. The locking and unlocking of the doors of the vehicle is carried out when the identification data matches the already stored data. A continuous reception condition is detected when the communication data is received for more than a predetermined period of time. When the continuous reception condition is detected, an alarm is actuated. As such, a common transmitting button of the transmitting device can be used to effect both control of the locking and unlocking of doors and alarm activation. The control apparatus may also include an erasable memory which is remotely settable in a writable status and in which identification data can be erased by remote control while in the writable status.

1 Claim, 16 Drawing Sheets

FIG. 14(1)
FIG. 14(2)
FIG. 14(3)
FIG. 14(4)
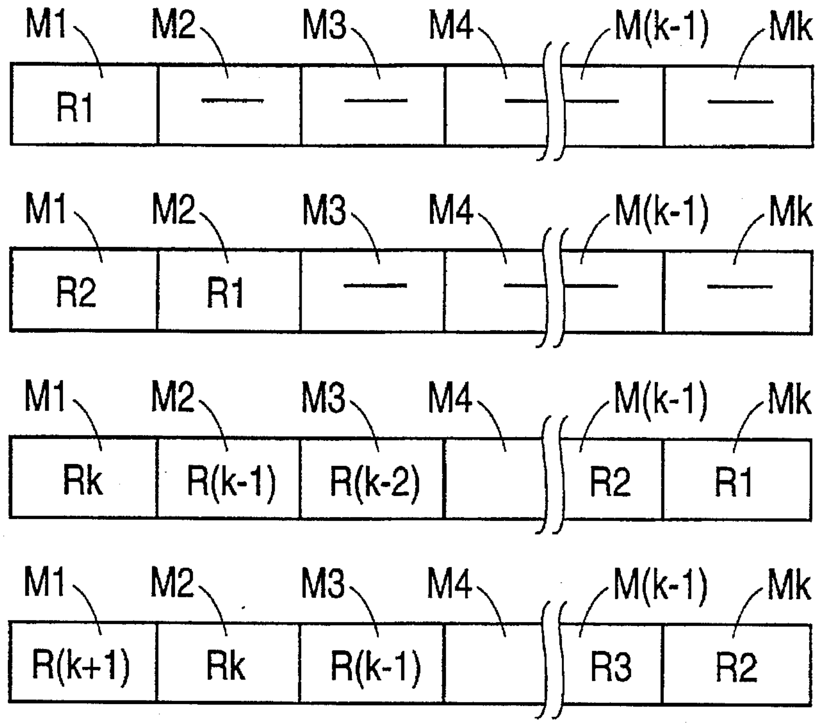
FIG. 15
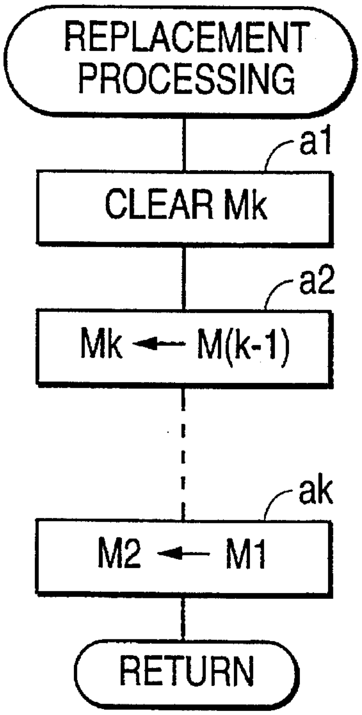

APPARATUS FOR REMOTELY CONTROLLING A DOOR LOCKING STATE AND THEFT PREVENTION ALARM STATE OF AN AUTOMOBILE

This application is a continuation of now abandoned application Ser. No. 07/566,231, filed on Aug. 9, 1990 now abandoned.

BACKGROUND OF THE INVENTION

1. Field of the Invention

The present invention is related to an apparatus which receives control information sent from a transmitter, and which is ideally suited for use as a remote controller in applications such as the so called keyless entry system for automobiles.

2. Description of the Prior Art

The keyless entry system is an apparatus which can control the locking and unlocking of an automobile's doors by remote control, even from a location at some distance from the automobile. This apparatus makes it possible for someone such as the driver to carry the transmitter, and without using a key, to lock or unlock the doors and trunk etc. by remote control, through an operation such as the pressing of a push button switch on the transmitter.

In the keyless entry system, a specific set of identification data is established in advance between a transmitter and receiver which form a set, and when the aforesaid push button switch is pressed, this identification data undergoes frequency modulation and is transmitted.

When the received electric field strength, detected by a squelch circuit in a standby mode, exceeds the preset threshold value, the receiver takes up the data and performs collation of the above mentioned identification data or the like. In this way, when the identification data match, the previously mentioned operations such as locking or unlocking of the doors are performed.

Thus, the receiver will produce a received response and perform door locking/unlocking control, only with respect to a control signal from a transmitter which matches the identification data registered in the receiver. Based upon this, improvements have been devised for security functions such as theft prevention.

On the one hand, theft prevention apparatuses have been extensively developed in recent years. This is the type of apparatus which detects the entry of a thief into the car without the use of a proper key, and which then generates an alarm. The current type of theft prevention apparatuses are constituted so that, for example, they detect the breaking of a window and hen generate an alarm. However, a problem still remains that even if the car's owner discovers from a distance that a thief is prowling around and is about to break into the car, he is not able to sound the alarm and prevent damage to the car before it occurs.

Accordingly, there has been a desire for a theft prevention apparatus with further improved security functions, through a combination of the keyless entry system's transmitter and receiver with the current type of theft prevention apparatus. However, the addition of these extra functions to the transmitter and receiver would complicate their construction.

Furthermore, the previously mentioned identification data is, for example, stored in a ROM (Read Only Memory), and the transmitter and receiver are equipped with these ROM's. Therefore, when the transmitter is lost, it is necessary to exchange the ROM in the receiver with one that matches the identification data of a new transmitter, and maintenance operations become very troublesome.

Still further, in order to avoid malfunctions at places such as parking lots, a large number of identification data combinations are created. Because of this, there is also the problem of mounting costs for the management of maintenance parts, since it is necessary for the manufacturer to maintain a stock of ROM's which correspond to all of the identification data combinations.

SUMMARY OF THE INVENTION

Therefore, the object of the invention is to present a novel and improved receiving apparatus in order to solve the abovementioned problems.

Another object of the invention is to present a receiving apparatus which can prevent the entry of a thief into a car before it occurs, by using the transmitter which controls the locking/unlocking of the car's doors.

In order to accomplish the abovementioned objects, in a receiving apparatus of the invention which receives a communication data including an identification data from a transmitter, comprising

- means for locking/unlocking doors,
- means for controlling the locking/unlocking means when the communication data matching the identification data is received,
- means for determining whether or not the communication data is being continuously received for more than a preset period of time, and
- means for generating an alarm when the continuous receiving condition is determined in the determining means.

Therefore, when the owner of a car discovers that a thief is about to break into his car, it is possible to prevent the break-in before it occurs, because the alarm will be generated if the communication data is transmitted for longer than a preset period of time. Furthermore, since the transmitter which controls the locking/unlocking of the doors serves a dual purpose, costs can also be reduced.

Moreover, when a determination of continuous receiving is to be made a described above, a squelch circuit is generally used, but if this kind of circuit is added to the receiving apparatus which controls the locking/unlocking of the doors, there would be an increase in cost.

Still another object of the invention is to present a receiving apparatus having a simple construction, which can make a reliable determination of continuous receiving.

In order to accomplish the abovementioned object, receiving apparatus of the invention which receives a communication data including an identification data from a transmitting apparatus is characterized by determining the continuous receiving condition by repeatedly performing a comparison of at least a part of the communication data and previously stored data.

In a preferred embodiment, the receiving apparatus is provided with means for determining the continuous receiving when all results of the comparisons within a present period of time are matches.

Further, in a preferred embodiment, the receiving apparatus is provided with means for determining the continuous receiving condition when, as results of the comparisons within a preset period of time, there is agreement for more than a preset number of times within a number of comparisons in that period of time.

Still further, in a preferred embodiment, the receiving apparatus is provided with means for determining the continuous receiving condition and establishing a judgment standard for each classification of the communication data, and the determining means determines the continuous condition receiving condition when all of the judgment standards for each classification are satisfied within a preset period of time as a result of the comparisons within the preset period of time.

In accordance with the invention, the continuous receiving condition is determined by a repeated comparison of at least a part of the communication data with the previously stored data, in a radiocommunication type receiving apparatus that does not have a squelch circuit. Therefore, the determination of the continuous receiving condition can be realized with a simple construction, without using a special construction such as a squelch circuit in a frequency modulation system. Further, since a comparison is performed of the communication data for which the continuous receiving condition determination is made, with the previously stored data, it is possible to prevent errors in the receiving of data.

Still another Object of the invention is to present a receiving apparatus with a simple construction making possible easy performance of writing, clearing and reading out of identification data, which can reduce maintenance costs.

In order to accomplish the abovementioned object, a receiving apparatus of the invention which receives a communication data including an identification data from a transmitting apparatus, comprises

- means for storing which makes possible the writing, clearing and reading out of the identification data,
- means for status setting to set the storing means to writable status, clearable status or readable status, and
- means for controlling in response to an output from the status setting means, in which
  - when the storing means is set to the writable status, receives the communication data from the transmitting apparatus, and writes the identification data contained in the received communication data to the storing means,
  - when set to the clearable status, clears the identification data stored in the storing means, and
  - when set to the readable status, reads out the identification data is from the storing means, and when the identification data that is read out matches the identification data contained in the received communication data, outputs an output signal which responds to the received communication data.

In a preferred embodiment, the receiving apparatus is provided with means for reporting which reports over the period of the status that the storing means is in the writable status.

Further, in a preferred embodiment, the status setting means includes means for switching the writable status and the readable status, and means for clocking the period after the switching means has operated,

- the status setting means sets into the status that the switching means is operated when a preset period of time is passed after the switching means is operated, and sets into the clearable status when, after the switching means is operated, the switching means is operated again before the time period is passed.

Still further in a preferred embodiment, the storing means is divided into a number of storing areas, and that in case the inputted identification data exceeds the number of divisions, the identification data is cleared in the order of the earliest input to the storing means.

In accordance with the invention, a storing means which can write, clear and read out the identification data, is provided in a receiving apparatus that receives a communication data, including an identification data, from a transmitting apparatus. A storing means is set to either a writable status, a clearable status or a readable status by a status setting means.

For example, when it is set to the writable status, a controlling means receives the communication data from the transmitting apparatus, and registers the identification data contained in the received communication data by writing it into the storing means.

In this way the written identification data is read out each time the controlling means receives communication data when the storing means is set to the readable status, and it is compared with the identification data contained in the received communication data. When, as a result of this comparison both are in agreement, the controlling means outputs an output signal based upon the received communication data.

Therefore, it is possible to write and register specific identification data with a simple construction. Based upon this, it is possible to devise maintenance cost reductions through the common use of parts, because it is not necessary to make the storing means correspond individually with identification data from the transmitting apparatus, and it is possible to make receiving apparatuses equipped with a common storing means to correspond individually with a number of transmitting apparatuses, each having different identification data.

Moreover, because it has been made possible to clear the stored contents of the storing means, when data communication is not needed, the response to communication from the transmitting apparatus can be stopped by clearing the stored contents. Based upon this, security functions can be improved since theft can be prevented before it occurs.

BRIEF DESCRIPTION OF THE DRAWINGS

Other and further objects, features, and advantages of the invention will be more explicit from the following detailed description taken with reference to the drawings wherein:

FIG. 15 is a flow chart that explains the replacement operation for the stored contents of the EEPROM 72, FIG. 16A and 16B form a flow chart that explains the operation of a receiver 17.

DETAILED DESCRIPTION OF THE PREFERRED EMBODIMENTS

Figure 1:
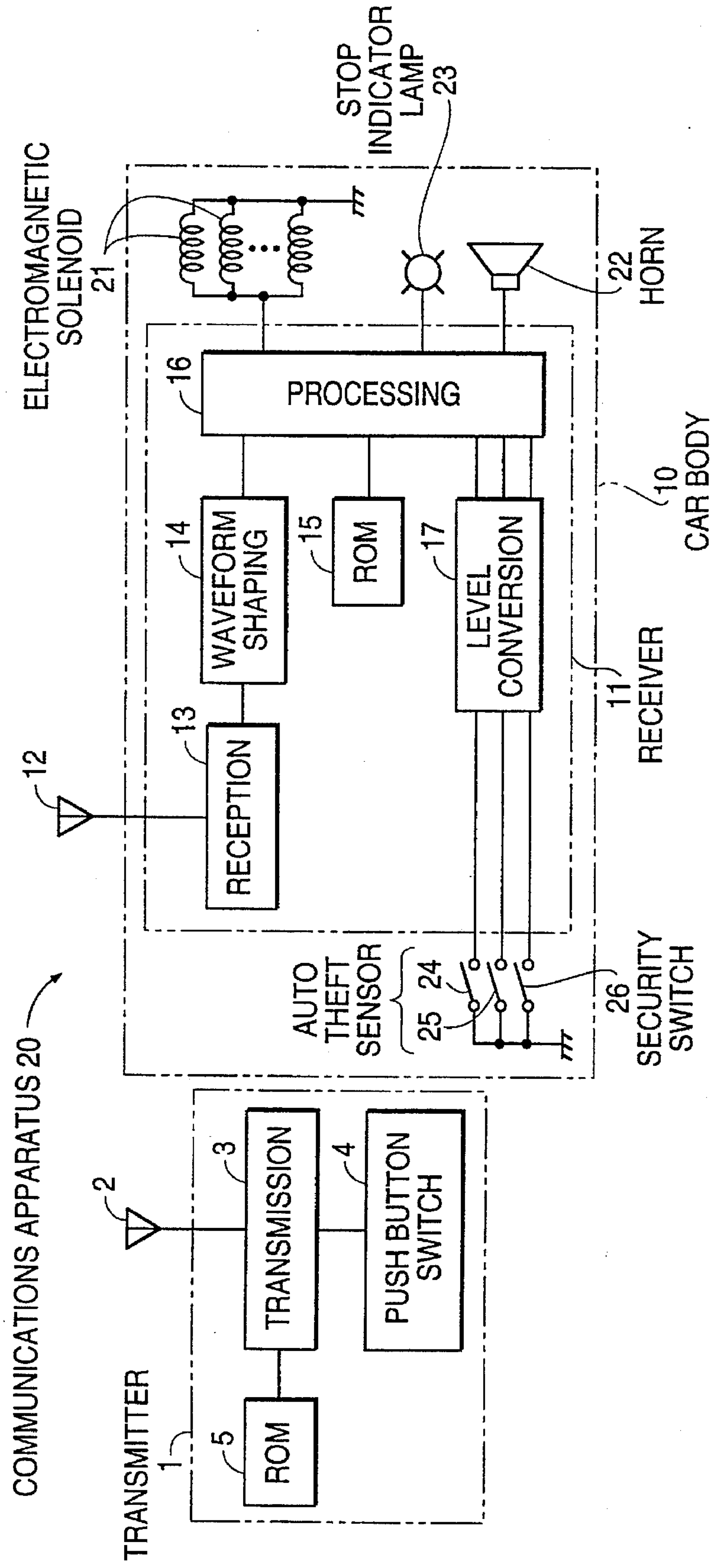
FIG. 1 is a block diagram that shows the electrical construction of a communication apparatus 20, in which one example of the invention, the receiver 11, is used.

Now referring to the drawing, preferred embodiments of the invention are described below.

FIG. 1 is a block diagram that shows the electrical construction of a communication apparatus 20, in which one example of the invention, the receiver 11, is used. The transmitter 1, which is carried by someone such as the driver, includes and is composed of an antenna 2, a transmitting circuit 3, a push button switch 4, and a read only memory (abbreviated below as ROM) 5.

On the other side, the receiver 11 which is carried in a car body 10, includes and is composed of an antenna 12, a receiving circuit 13, a waveform shaping circuit 14, a ROM 15, a processing circuit 16 which i realized by a microcomputer or the like, and a level conversion circuit 17.

The same identification data is mutually stored in ROM's 5 and 15, and this identification data is set individually for each car body 10. When the push button switch 4 of the transmitter 1 is operated by the operator, the data stored in ROM 5, which includes the identification data, undergoes amplitude modulation and is transmitted from the antenna 2 of the transmitter 1.

In the receiving standby mode for times such as when the automobile is stopped, the data signal from transmitter 1 is received by the antenna 12, goes through the receiving circuit 13, is shaped into a data pulse in the waveform shaping circuit 14, and is input to the processing circuit 16. In the processing circuit 6, when the identification data of the inputted data pulse matches the identification data stored in the ROM 15, the operation mode is switched for an electromagnetic solenoid 21 as locking/unlocking means for the doors and trunk or the like of the car body 10.

Namely, when the doors and trunk or the like are in an unlocked condition, they will be put into a locked condition by the operation of the push button switch 4. Also at this time, the change to the locked condition is reported to the operator by performing the response operations of sounding a horn 22 one time, together with the lighting of a stop indicator lamp 23 one time. As opposed to this, when they are in a locked condition, they will be put into an unlocked condition by the operation of the push button switch 4. Also, the change to the unlocked condition is reported to the operator by performing the response operations of sounding the horn 22 two times, together with the lighting of the stop indicator lamp 23 two times. The so called keyless entry is realized in this way.

Moreover, auto theft sensor, such as a hood switch 24 that turns on when a hood is opened, and a courtesy switch 25 that turns on when the door is opened, are connected to the processing circuit 16. When a setting status of a security switch 26 is turned on, and then the hood switch 24 or courtesy switch 25 or the like are turned on, the processing circuit 16 activates a theft alarm sounding the horn 22. Further, the output from all of the switches 24 through 26 is read into the processing circuit 16, after being converted by a level conversion circuit 17 to correspond to the input level of the processing circuit 16.

Figure 2:
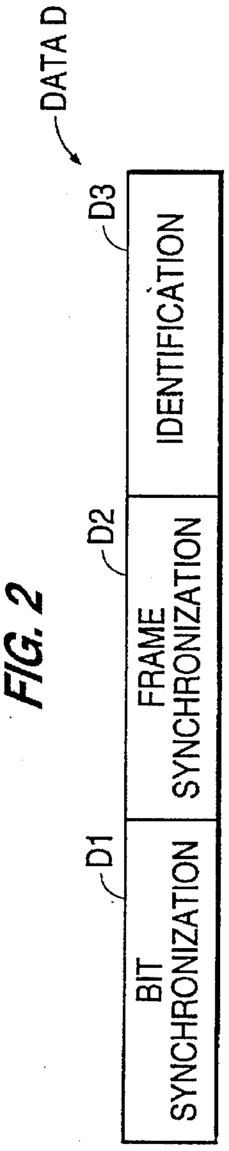
FIG. 2 is a diagram that shows the type of data D transmitted from a transmitter 1.

On the other hand, the data D of the data signal transmitted from the transmitter 1 to the receiver 11, as shown for example in FIG. 2, is composed of a bit synchronization data D1, a frame synchronization data D2, and an identification data D3, and when all of the data match, the door locking/unlocking operations are carried out.

Further, when the data receiving state as described above continues and lasts for longer than the preset time period W, then in response to the operation in the transmitter 1 it is determined that the car body 10 is being exposed to theft, and the security operation is performed. In other words with this operation, when the car is about to be stolen, or when a rider is about to get into the car and is assaulted by a thug, the person carrying the transmitter 1 activates the security operation and frightens the thug by operating the push button switch 4 for longer than the time period W. The security operation is, for example, the sounding of the horn 22 and the flashing of the stop indicator lamp 23 during a preset time period Wa.

Figure 3:
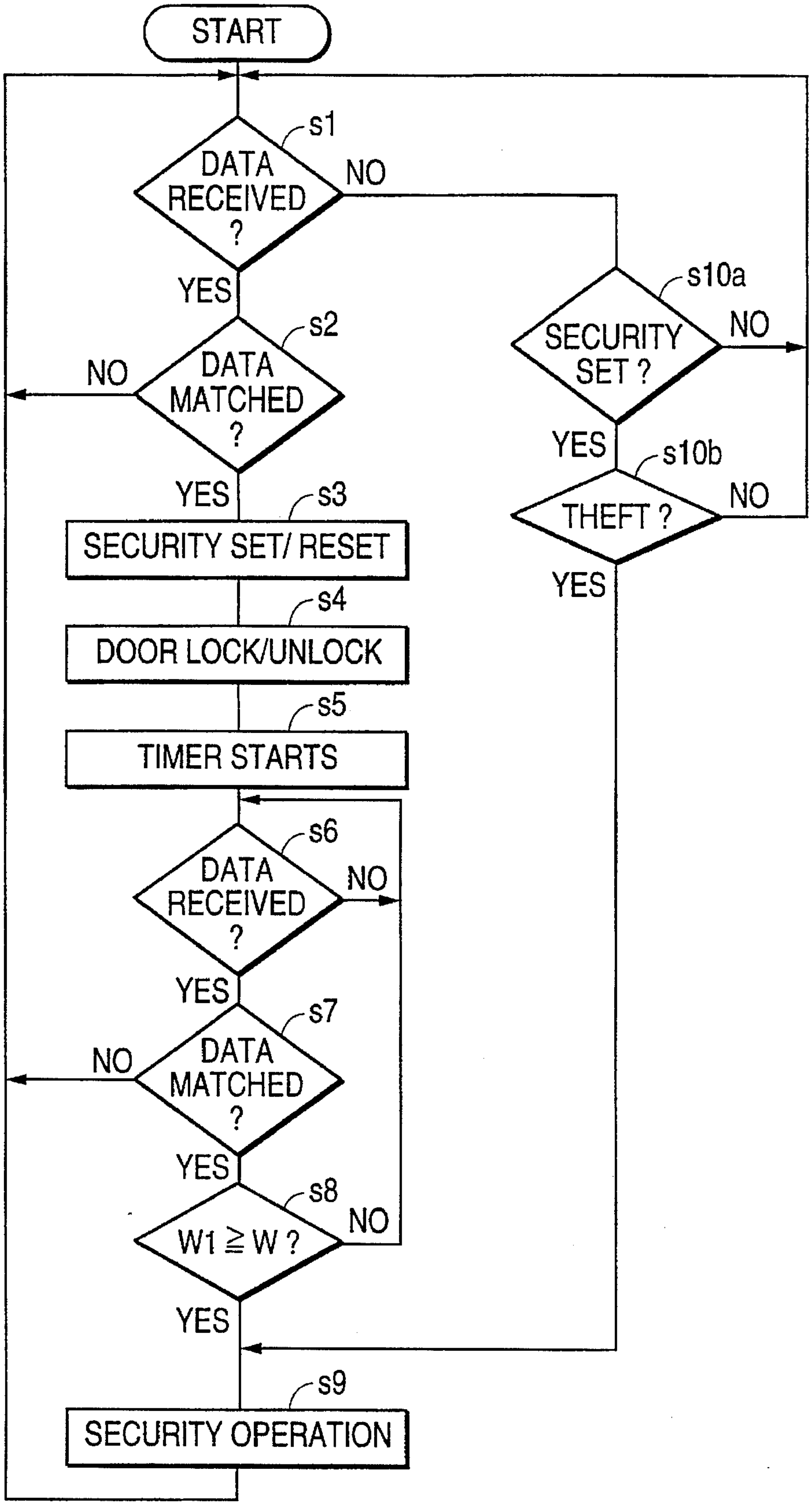
FIGS. 3 and 4 are flow charts that explain the operation of receiver 11 which is one example of the invention.

FIG. 3 is a flow chart that explains the data receiving operation of receiver 11, which is one example of the invention. At step s1, it is determined whether or not the data D has been received, and when data D has been received it moves to step s2. Further, it is determined that data D has been received when the bit synchronization data D1 and the frame synchronization data D2 are correct. At step s2, it is determined whether or not the identification data D3 is in agreement; when it is not in agreement it returns to the step s1, and when in agreement it moves to step s3.

At step s3, setting or resetting of the security operation is performed. That is to say, if the present status is the "set" status, then resetting will be performed, and if it is the "reset" status, then setting will be performed. Next at step s4, the door locking/unlocking operation is performed. That is to say, if the present condition is the locked condition, then it will be unlocked, and if it is the unlocked condition, then it will be locked. Further, when setting is performed at step s3 the door will be locked at step s4, and when resetting is performed at step s3 the door will be unlocked at step s4. Also at this step s4, the response operation is performed which indicates that the operation in question has been performed. At step s5, from the point at which in this way the receiving of data D begins, the timer in the processing circuit 16 begins a counting operation.

At step 36, in the same way as step s1, it is determined whether or not the receiving of the data D is being continued; when it is not, this step s6 is repeated, and when the receiving of the data D is being continued, it moves to step s7. At step s7, collation of the identification data D3 is performed again; when there is agreement it moves to step s8, and when there is not agreement it returns to step s1.

At step s8, it is determined whether or not a timer's counting time w1 is more than the preset time W, for example, about 2 seconds; when it is not, it returns to the step s6, and when the time W has elapsed, it moves to step s9. At step s9, it returns to the step s1 after the security operation is performed. In this way with steps s6 through s9, the security operation is realized by means of operation in the transmitter 1.

When data D is not received at the step s1, it moves to step s10*a* where it is determined whether or not security is set, and if set, it is then determined whether or not theft is occurring at step s10*b*, and if this is the case, it then moves to the step s9 and performs the security operation. In this way with steps s10*a*, s10*b*, and s9, the security operation is realized by means of the car's theft sensors. Further, when security is not set at step s10*a*, and when it is determined at step s10*b* that theft is not occurring, it returns to step s1, and when in this way data D is not received and theft is not detected, it repeats these steps s1, s10*a*, and s10*b*.

Figure 4:
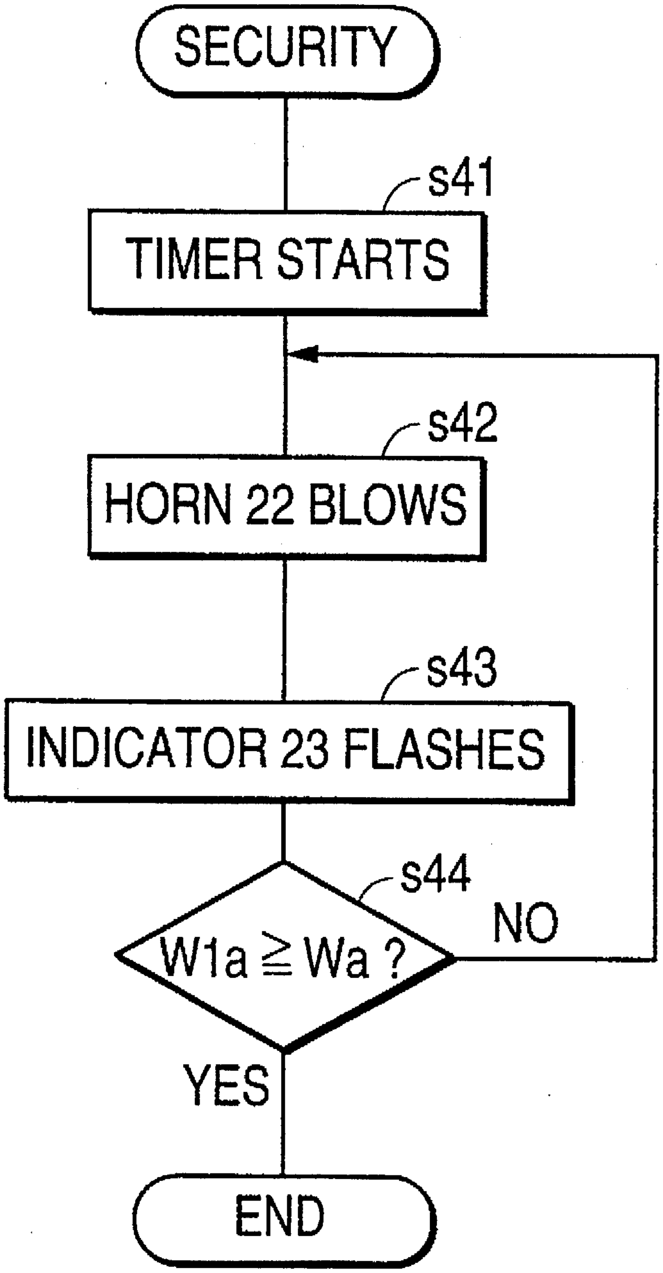

FIG. 4 is a flow chart that explains the security operation. At step s41, the timer's counting operation is started. At step s42 the horn 22 is blown, and at step s43 flashing of the top indicator lamp 23 is performed. At step s44, it is determined whether or not the timer's counting time W1*a* has elapsed only as far as the preset time Wa, for example about 60 seconds; when it has not, it returns to the step s42 continuing the security operation, and when it has, the operation is finished.

In this way, with the receiver 11 which conforms to the invention, simplification of construction together with a marked improvement in functionality are made possible, because two operations, the door locking/unlocking operation and the security operation, have been realized in accordance with the operational state of the push button switch 4, without using a special construction such as a squelch circuit, as in the prior art.

Figure 5:
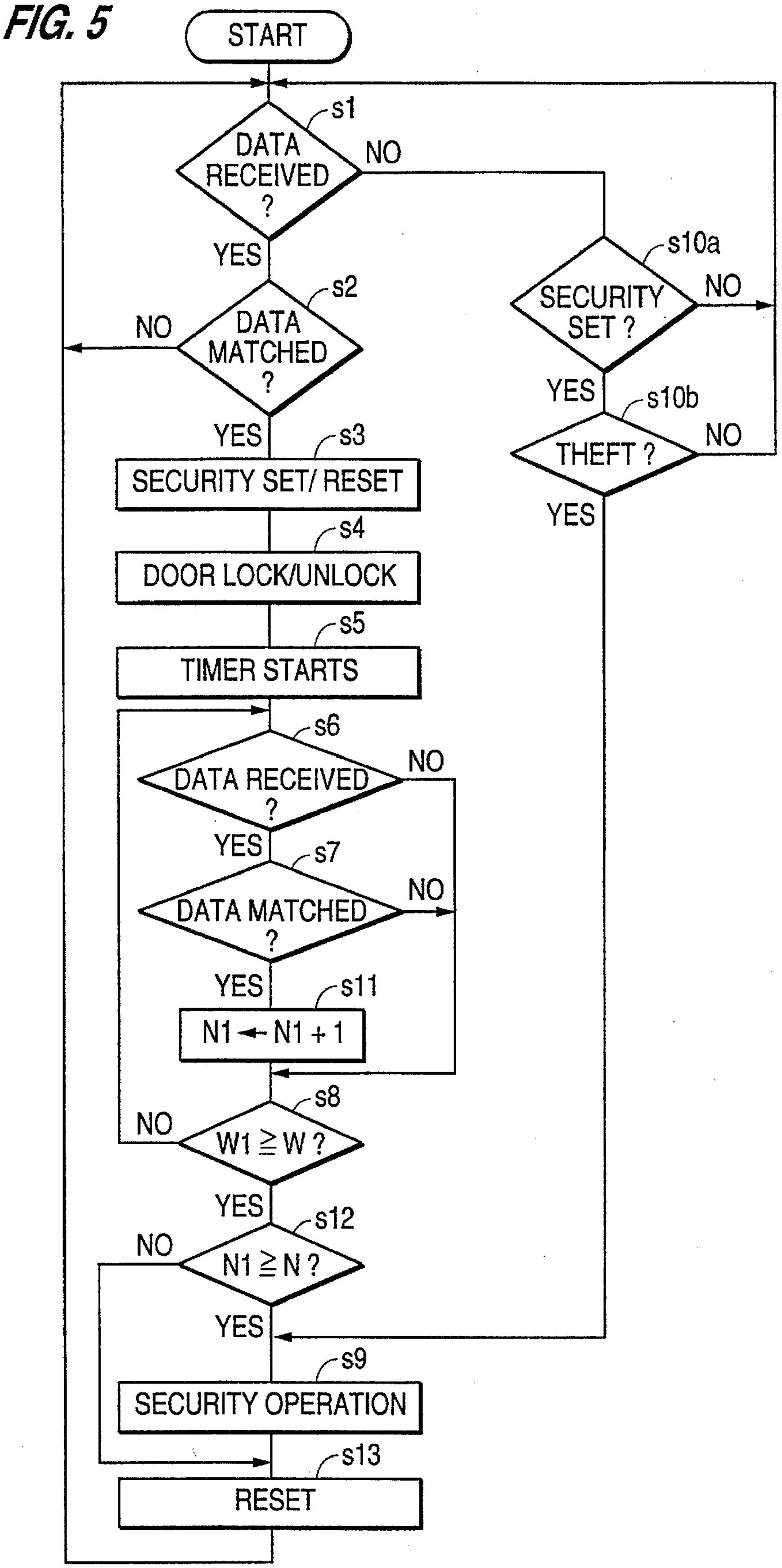
FIG. 5 is a flow chart that explains the data receiving operation for another example of the invention, FIGS. 6A and 6B form a flow chart that explains the data receiving operation for yet another example of the invention.

FIG. 5 is a flow chart that explains the data receiving operation of another example of the invention, and as this example is similar to the previously discussed example, the same reference numbers will be given for the corresponding parts. In this example, when the data D is in agreement at step s7, it moves to step s8 after performing the counting operation for the count value N1 of the counter in the processing circuit 16 at step s11. Further, when the receiving of data D is not detected at step s6, and when the data D is not in agreement at step S7, it moves directly to step s8.

At step s8, when the timer's counting time W1 passes the preset time W, it moves to step s12 where it is determined whether or not the count value N1 is greater than the preset value N; when it is greater, it moves to the step s9 and the security operation is performed, and when it is not greater, the counter's count value is reset at step s13 and it then return to the step s1.

Further, for example, data D is transmitted from the transmitter 1 about 20 times during the time period W of 2 seconds, and for this reason the value of N is set to about 16.

Therefore, even in cases where some receiving errors are generated due to noise or other factors, it is possible to determine the continuous receiving condition and to realize a greater degree of accuracy in the security operation.

Figure 6A:
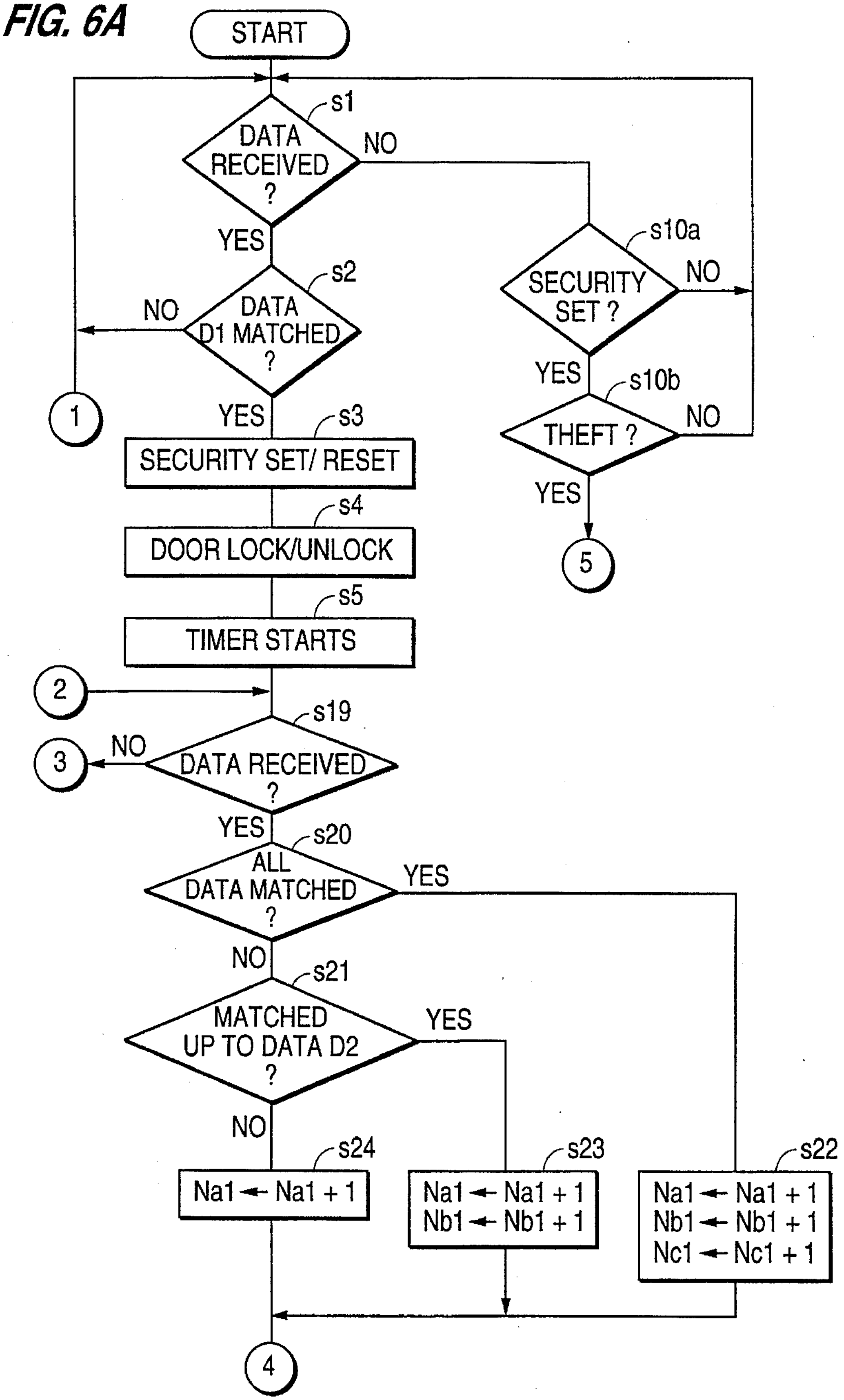
Figure 6B:
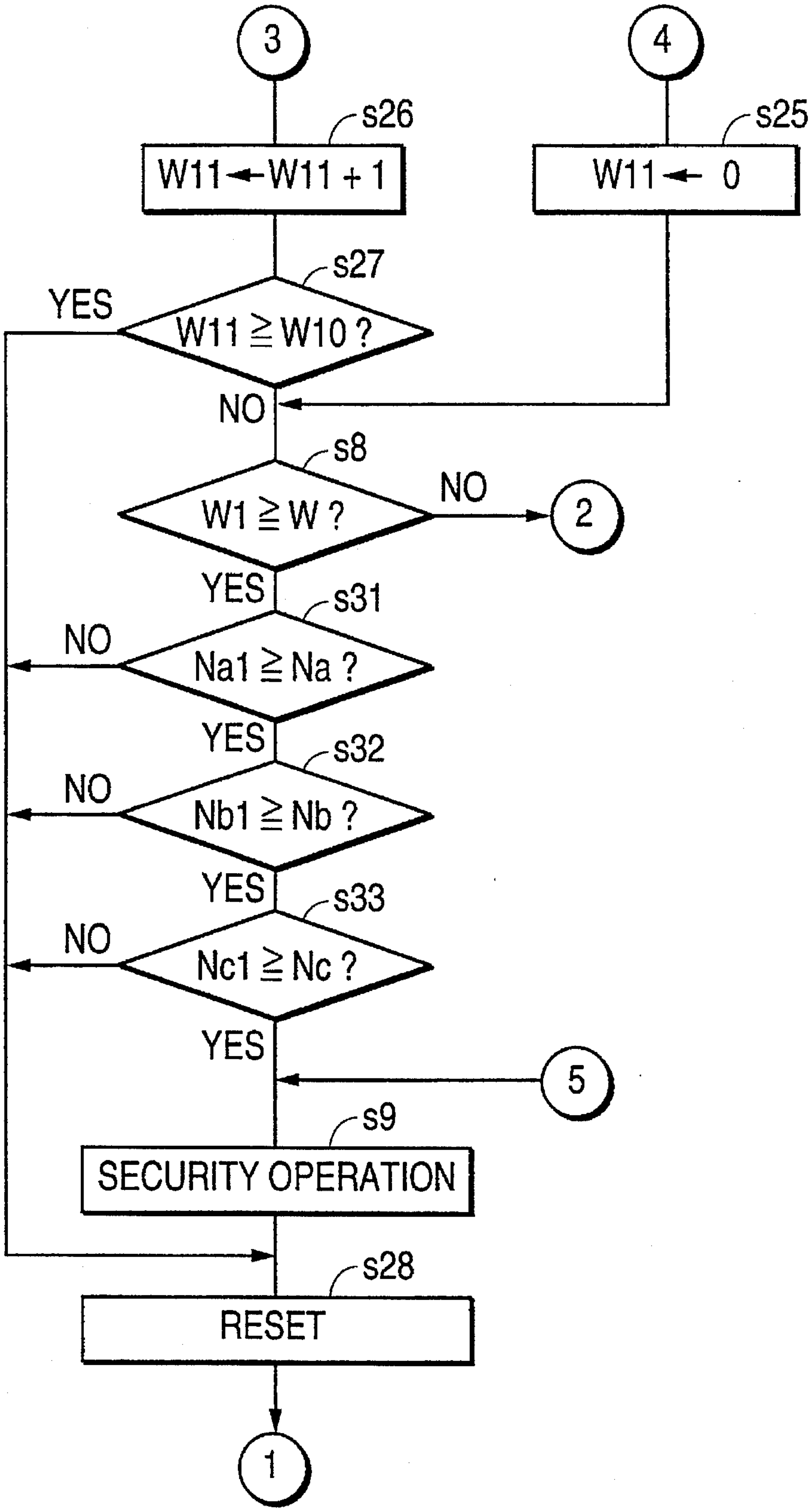

FIG. 6 is a flow chart that explains the data receiving operation of yet another example of the invention, and as this example is similar to the previously discussed example, the same reference numbers will be given for the corresponding parts. In this example, at step s19, it is determined that the continuous receiving is taking place if the bit synchronization data D1 is in agreement, and at that time it is determined at steps s20 and s21 respectively, up to what point the data contained in the data D has been received error free, and based upon the results of that determination, the counting operation is performed at steps 22 through 24 respectively.

In other words, when all of the data D up to the identification data D3 is received error free, it moves from step s20 to step s22, and all of the count values, the count value Na of the bit synchronization data D1, the count value Nb of the frame synchronization data D2, and the count value Nc of the identification data D3, are added together.

Further, when the reception up to the frame synchronization data D2 is error free, it moves from step s21 to step s23, and the count value Na of the bit synchronization data D1 and the count value Nb of the frame synchronization data D2 are added together. Still further, when only the bit synchronization data D1 is received, it moves from step s21 to step s24, and the count value Na of the bit synchronization data D1 is added.

From the steps s22 through s24 it moves to step s25, and after the count value W11, which indicates the fact that data D has not been received, has been reset, it moves to the step s8. Further, when continuous receiving of data D is not detected at the step s19, and after adding the count value W11 at step s26, it moves to step s27.

At step s27, it is determined whether or not the count value W11 is greater than the preset value W10, and when it is, that is to say when the nonreceiving condition continue, for example, for longer than the count value W10 of about 0.4 seconds, all of the count values are reset at step s28 and it returns to the step s1.

Moreover, when the count value W11 at step s27 is less than the value W10, it moves to step s8. At step s8, it is determined whether or not the timer's counting time W1 has become greater than the preset time W, and when it has not, it returns to the step s19, and when it has, it moves to step s31.

At steps s31 through s33, it is determined whether or not all of the count values N1a, N1b, and N1c are respectively greater than the preset values Na, Nb, and Nc, and only when all of them are satisfied, it moves to the step s9 and the security operation is performed; when any one of them is not satisfied, it returns to step s1 after all of the count values are reset at the step s28. Further, for example, the value Na is set to 16, the value Nb is set to 10, and the value Nc is set to 6.

According in this example, with the continuation of a favorable receiving state, all of the conditions indicated in the steps s31 through s33 are satisfied, and moreover, since it has been made to perform the security operation only when the count value W11 of the nonreceiving condition at step s27 is less than the preset value W10, it is possible to improve accuracy still further based upon this.

Figure 7:
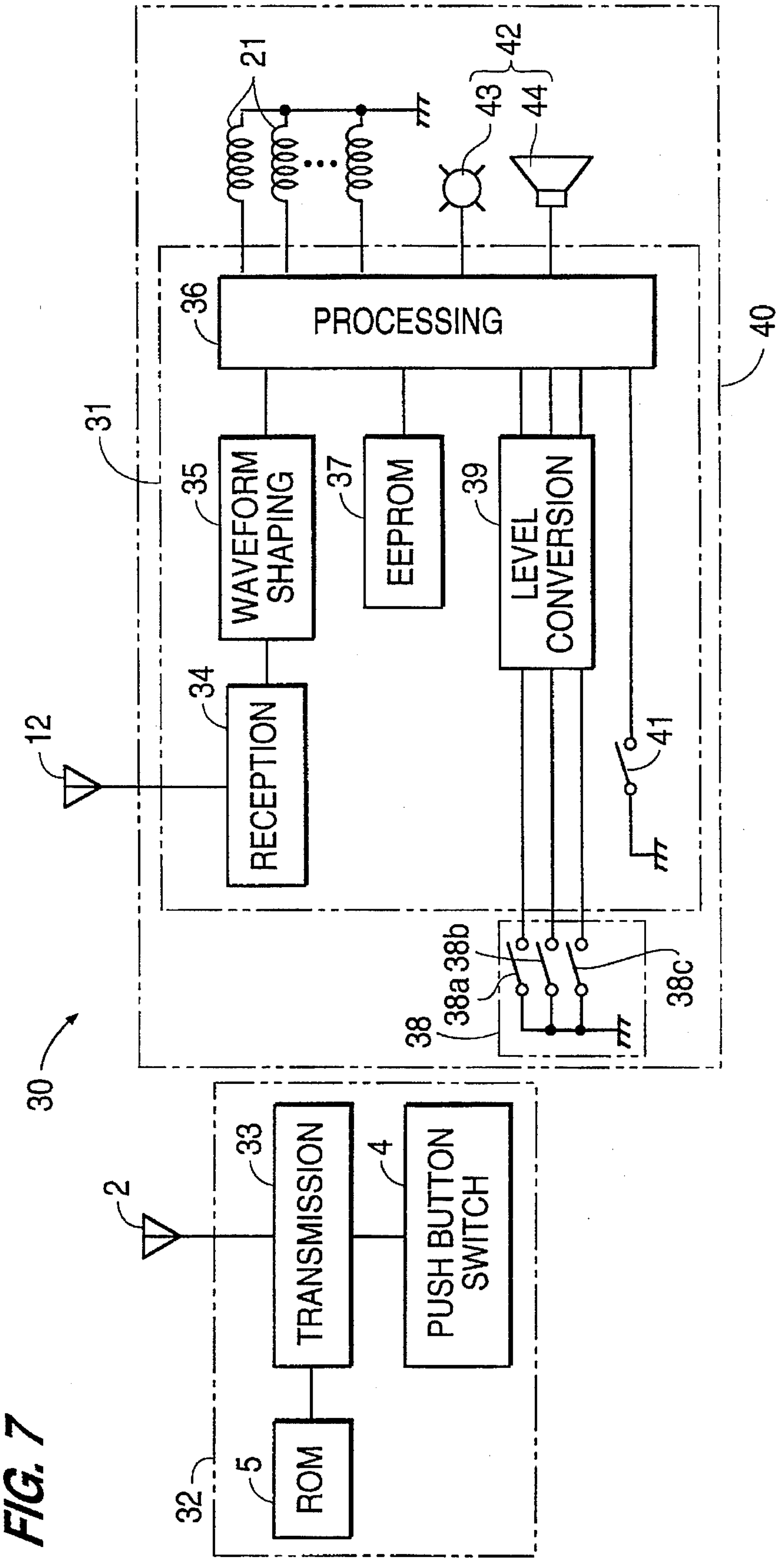
FIG. 7 is a block diagram that shows the electrical construction of a communication apparatus 30, in which another example of the invention, the receiver 31, is used.

FIG. 7 is a block diagram that shows the electrical construction of the communication apparatus 30, in which another example of the invention, the receiver 31, is used, and as this example is similar to the previously discussed example, the same reference numbers will be given for the corresponding parts n this example, when the push button switch 4 is operated, a transmission circuit 33 of a transmitter 32 performs FSK (Frequency Shift Keying) modulation on, for instance, a 30 MHz carrier wave and then transmits it from the antenna 2 in accordance with the data stored in ROM 5, which includes the identification data.

The receiver 31 which is carried in a car body 40 receives the data from the transmitter 32 with the antenna 12, and reads it into the processing circuit 36 after it is demodulated in a receiving circuit 34 and formed into a data pulse in a waveform shaping circuit 35. When the identification data of the read in data matches the identification data stored in an EEPROM (Electrically Erasable Programmable ROM) 37, a processing circuit 36 changes the operating state of the electromagnetic solenoid 21, in response to the output from a switch group 38 which will be discussed later.

Switch group 38 is a group of switches for establishing which door's locking/unlocking is to be controlled, and for example, is composed of switches such as a door switch 38*a* for setting the door control, a hood switch 38*b* for setting the engine hood control, and a trunk switch 38*c* for setting the trunk control. The output of this switch group 38 is read into the processing circuit 36 after being converted to correspond with the input level of the processing circuit 36, in a level conversion circuit 39, Further, a status setting switch 41 is provided in conjunction with the processing circuit 36. When this status setting switch 41 is turned on, the EEPROM 37 is set to the writable status, and it is possible to register the identification data D3 of the received data D, which is input by way of the receiving circuit 34 from the antenna 12. As opposed to this, when the status setting switch 41 is turned off, the EEPROM 37 is set to the readable status, and each time a data signal is received from the transmitter 32, the identification data is read out from the EEPROM 37 and compared with the identification data D3 from the transmitter 32; as a result of the comparison, in the case where the two sets of identification data are the same, the regular keyless entry control is performed, which controls the locking/unlocking of the doors.

Moreover, switches 24 through 26 for the security may also be connected to the processing circuit 36.

Further, a reporting means 42 is connected to the processing circuit 36. Means such as a LED (Light Emitting Diode) 43 and a horn 44 are given as examples of the reporting means 42. Further for this horn 44, the horn 22 which generates the alarm sound may be used in common, or a buzzer or the like may be used. The reporting means 42, reports on such conditions as whether or not the EEPROM 37 is in a writable status, and further, whether or not the writing of the identification data has been completed. For example, the LED 43 may light up or flash while set to the writable status, and the horn 44 may blow when the writing of the identification data into the EEPROM 37 is completed.

Figure 8:
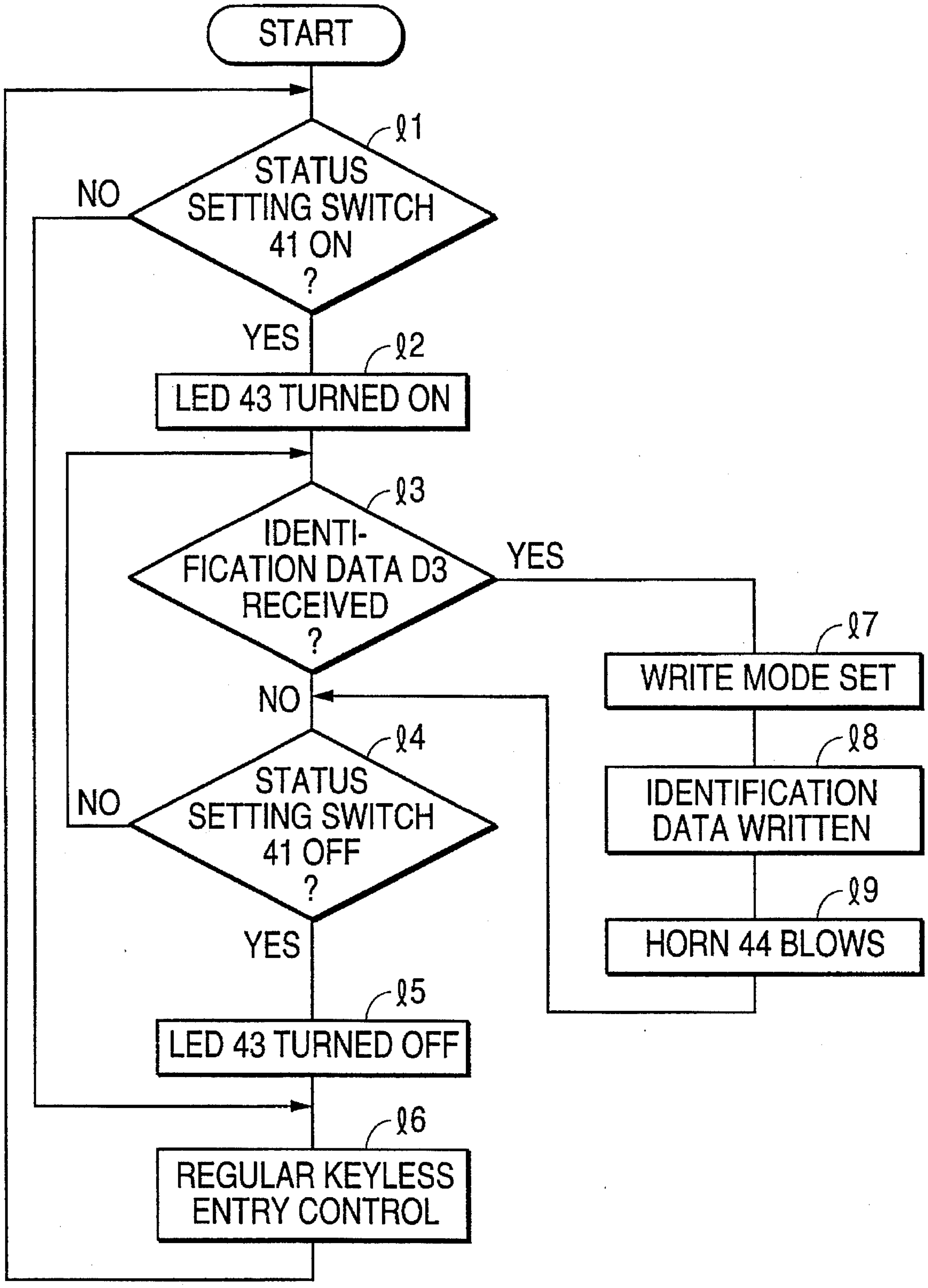
FIG. 8 is a flow chart that explains the operation of the receiver 31.

FIG. 8 is a flow chart that explains the operation of receiver 31. At step l1, it is determined whether or not the status setting switch 41 is turned on. In other words, it is determined whether or not the EEPROM 37 is set to the status in which the identification data can be written, and when it is not, it proceeds to step l6 and perform regular keyless entry control. That is to say, the identification data D3 which is transmitted from the transmitter 32 is compared with the identification data stored in the EEPROM 37, and as a result, if the door is in a locked condition, the unlocking control is performed, and if the door is in an unlocked condition, the locking control is performed. In this way the door's locking/unlocking control is performed in response to the data signal from the transmitter 32.

When the status setting switch 41 is turned on at the step l1, the ED 43 of the reporting means 42 lights up at step l2. At step l3, it is determined whether or not the identification data D3 which is to be registered has been received by the receiving circuit 34, and when it has not been received, it proceeds to step l4 and determines whether or not the status setting switch 41 has been turned off, or in other words, whether or not the writable status of the EEPROM 37 has been released. In the case that the status setting switch 41 has not been turned off, the processing returns to step l3 and the determination is repeated. In this way when the status setting switch 41 is turned off, it proceeds from step l4 to step l5, and with the release of the writable status the LED 43 turns off, and it returns to the regular keyless entry control.

On the other hand, while the EEPROM 37 is set to the writable status, when the identification data D3 which is to be registered is received at the step l3, it proceeds to step l7, the processing circuit 36 is set to the write mode, the identification data D3 is written into the EEPROM 37 at step l8, after the writing is completed the horn 44 of the reporting means 42 is blown one time, and then after determining the conclusion of the writable status at step l4, it returns to the regular keyless entry control.

Therefore, according to the example described above, the writable status of the EEPROM 37, which is connected to the processing circuit 36, is set by changing the status setting switch 41, and when in the writable status, reading and registering can be easily accomplished by receiving the identification data D3 which is to be registered from the transmitter 32. Consequently, for example, even when the transmitter 32 is lost and it is necessary to register the identification data for a new transmitter 32, registering into the EEPROM 37 of the receiver 31 can be accomplished easily.

In other words, there is no need for troublesome operations such as the replacement of memory parts in order to register new identification data, as has been the case up until now, and it is possible to hold down the cost of maintenance part management. Still further, because the reporting means 42 is provided, it is possible for the operator to easily confirm factors such as the writable status and the completion of writing, which makes for excellent operability. Further, since the status setting switch 41 is constructed with two stable positions, the operator can operate it while fully confirming the status, and malfunction can be prevented.

Figure 9:
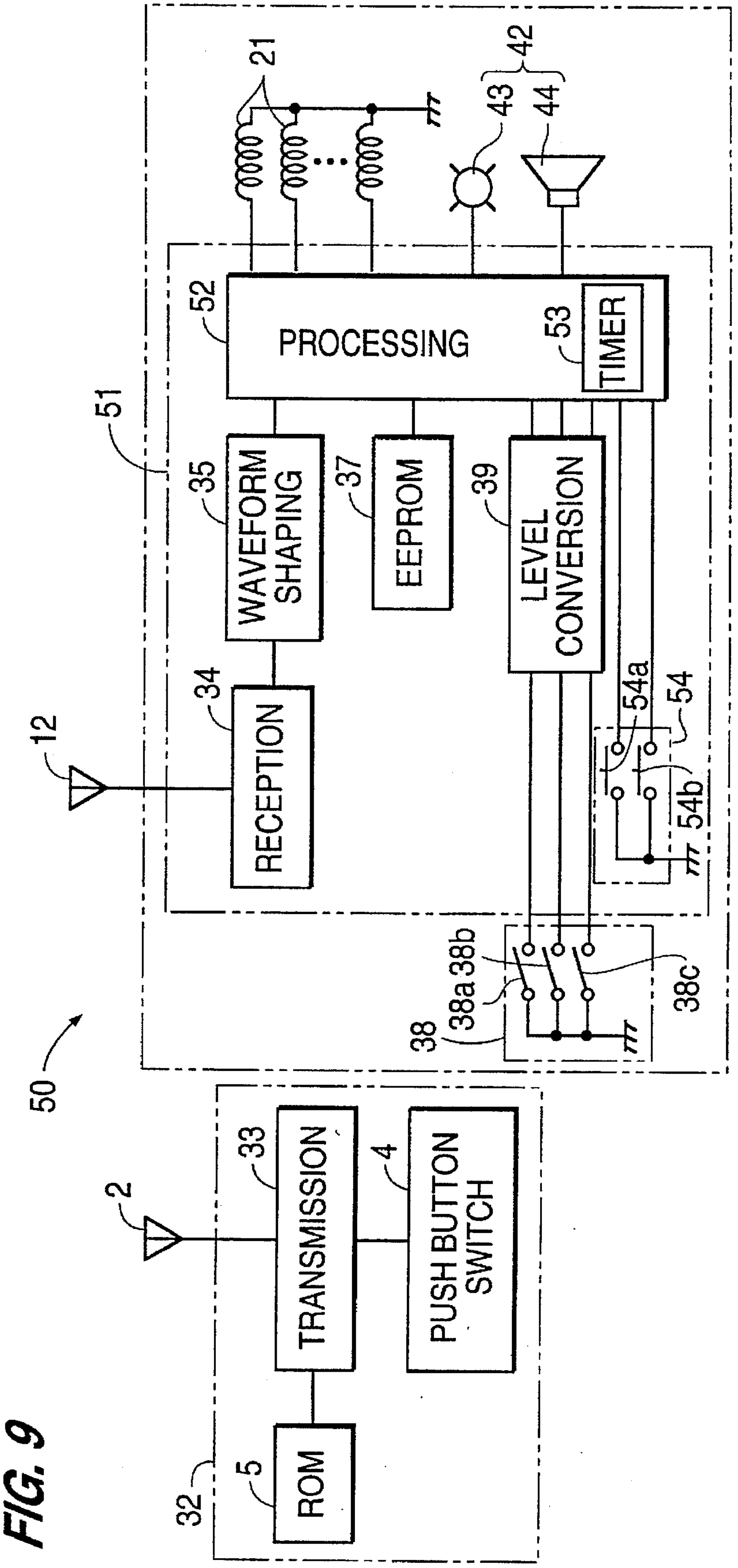
FIG. 9 is a block diagram that shows the electrical construction of a communication apparatus 50, in which yet another example of the invention, the receiver 51, is used.

FIG. 9 is a block diagram that shows the electrical construction of the communication apparatus 50, in which yet another example of the invention, the receiver 51, is used, and the same reference numbers are used for parts which correspond to the previous example. In this receiver 51, timer 53 is provided in a processing circuit 52 which controls the locking/unlocking of the doors, and further, a status setting switch 54 is composed of two switches 54*a* and 54*b*. The status setting switch 54 does not have two stable positions like the previously mentioned status setting switch 41, but is constructed so that, as with a so called push switch, a single pressing operation outputs a one pulse signal.

In this example, once switch 54*a* is operated, the EEPROM 37 is set to the writable status and the timer 53 begin to count, from that point of operation. When the count value t of the timer 53 reaches the preset value T, for example 5 seconds, the writable status of the EEPROM 37 is automatically released.

Further, the processing circuit 52 has a function for clearing the stored contents within the EEPROM 37. In other words, it is constructed so as to clear the stored contents of the EEPROM 37 after the switch 54*a* is operated, and when the switch 54*b* is operated before the count value t of timer 24 passes the preset value T. The time for determining that the switch 54*b* has been operated is selected, for example, to be about 2 seconds.

Figure 10:
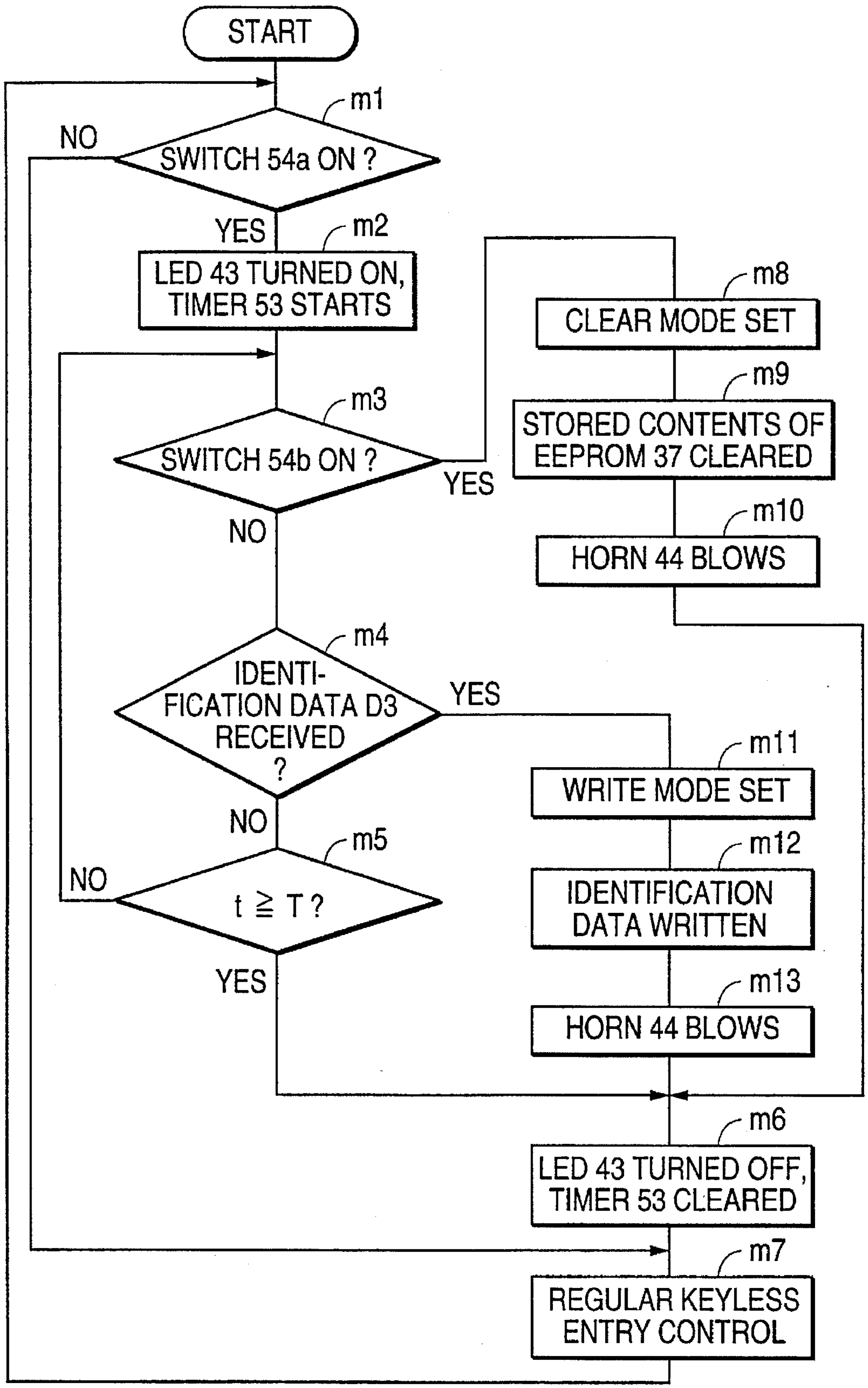
FIG. 10 is a flow chart that explains the operation of the receiver 51.

FIG. 10 is a flow chart that explains the operation of receiver 51. At step m1, it is determined whether or not the operation of switch 54*a*, for the registering of the identification data, has been performed, and when it has not, it proceeds to step m7 and performs the kind of regular keyless entry control previously mentioned. Further, when switch 54*a* has been operated at step m1, it proceeds to step m2, sets the EEPROM 37 to the writable status, and together with the lighting or flashing of LED 43, counting with the timer 53 begins.

After that, it is determined at step m3 whether or not switch 54*b* has been operated. In case the determination is negative, the identification data D3 which is to be registered at step m4 is transmitted from the transmitter 32, and it is determined in the receiving circuit 51 whether or not it has been received. In case the determination at the step m4 is negative, the processing proceeds to step m5 and it is determined whether or not the count value t of the timer 53 has exceeded the preset value T. In case the determination at the step m5 is negative, the processing returns again to step m3, and the processing of the above mentioned steps m3 through m5 is repeated.

When the count value t exceeds the preset value T, the processing proceeds to step m6, it is determined that the write registration of new identification data was not performed within the preset time period, the writable status of the EEPROM 37 is released, together with the turning off the LED 43, the count value t of timer 53 is cleared, and at step m7 regular keyless entry control is performed similar to that mentioned above.

On the other hand, when it is determined that the switch 54*b* has been operated before the count value t of the timer 53 has reached the preset value T at the step m3, the EEPROM 37 is set to the clear mode at step m8, all of the stored contents are cleared at step m9, the horn 44 is blown once at step m10, and it proceeds to the above mentioned step m6.

Further, when the identification data D3 which is to be registered at the step m4 is received before the count value t of the timer 53 reaches the preset value T, it move to step m11, the EEPROM 37 is set to the write mode, the received identification data D3 is written at step m12, the horn 44 is blown twice at step m13, and it proceeds to the above mentioned step m6.

The reason that the horn 44 is blown a different number of times at the steps m10 and m13, is that the respective objectives of blowing the horn 44 are to clearly report to the operator the difference between the clearing of the EEPROM 37 and the completion of writing to the EEPROM 37. Therefore, the number of times the horn 44 is blown, is not limited in this example.

In this way based upon the above example, it is possible to easily register the identification data D3 of the transmitter 32 into the receiver 51, with a simple operation similar to the examples shown in FIGS. 7 and 8 above. Further, forgetting to change the switch, such as when the operator leaves the EEPROM 37 set to the writable status through carelessness or the like, can be prevented, because when the identification data D3 to be registered is not received within the time period clocked in advance using the clocking means, timer 53, the writable status of the EEPROM 37 is released automatically. Moreover, the selection of the write mode and clear mode for the EEPROM 37 can be implemented with a simple operation of the status setting switch 54, making for very high operability.

Furthermore, because a clear mode is provided for the EEPROM 37, when for example, the operator leaves the automobile for a long period of time, by clearing the stored contents of the EEPROM 37 it becomes impossible to release the door locks with a transmitter having any kind of identification data, and security is improved greatly.

Figure 11:
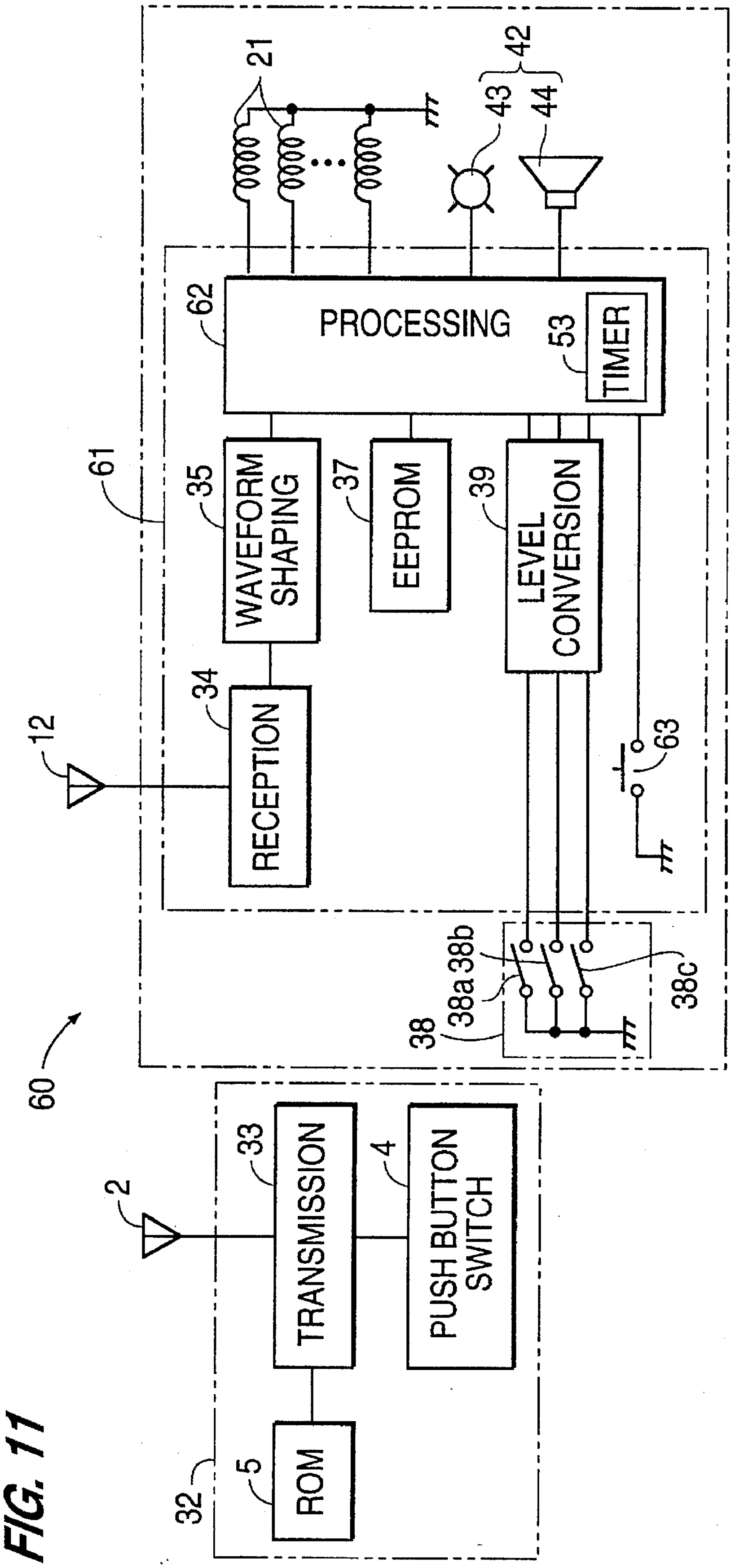
FIG. 11 is a block diagram that shows the electrical construction of a communication apparatus 60, in which another example of the invention, the receiver 61, is used.

FIG. 11 is a block diagram that shows the electrical construction of a communication apparatus 60, in which another example of the invention, the receiver 61, is used, and the same reference numbers are used for parts which correspond to the previous example. In this receiver 61, a status setting switch 63, which is connected to a processing circuit 62 that controls the locking/unlocking of the doors, is composed of one push switch.

In other words, the example shown in FIG. 9 above is constructed so that the switch 54*a* is operated when the EEPROM 37 is set to the writable status, and furthermore the switch 54*b* is operated when the EEPROM 37 is set to the clear mode during the preset period T, however, one common status setting switch 63 can be used for these switches 54*a* and 54*b*.

That is to say, it should be constructed so that when the EEPROM 37 is set to the writable status, and once the status setting switch 63 is operated, at that time the counting of timer 53 is started, and by a second operation of the status setting switch 63 during the preset period T, it is set to the clear mode. Further, it is constructed so that in case the second operation of the status setting switch 63 is not performed by the time the count value t of timer 53 exceeds the preset value T, the writable status of the EEPROM 37 is released automatically.

Figure 12:
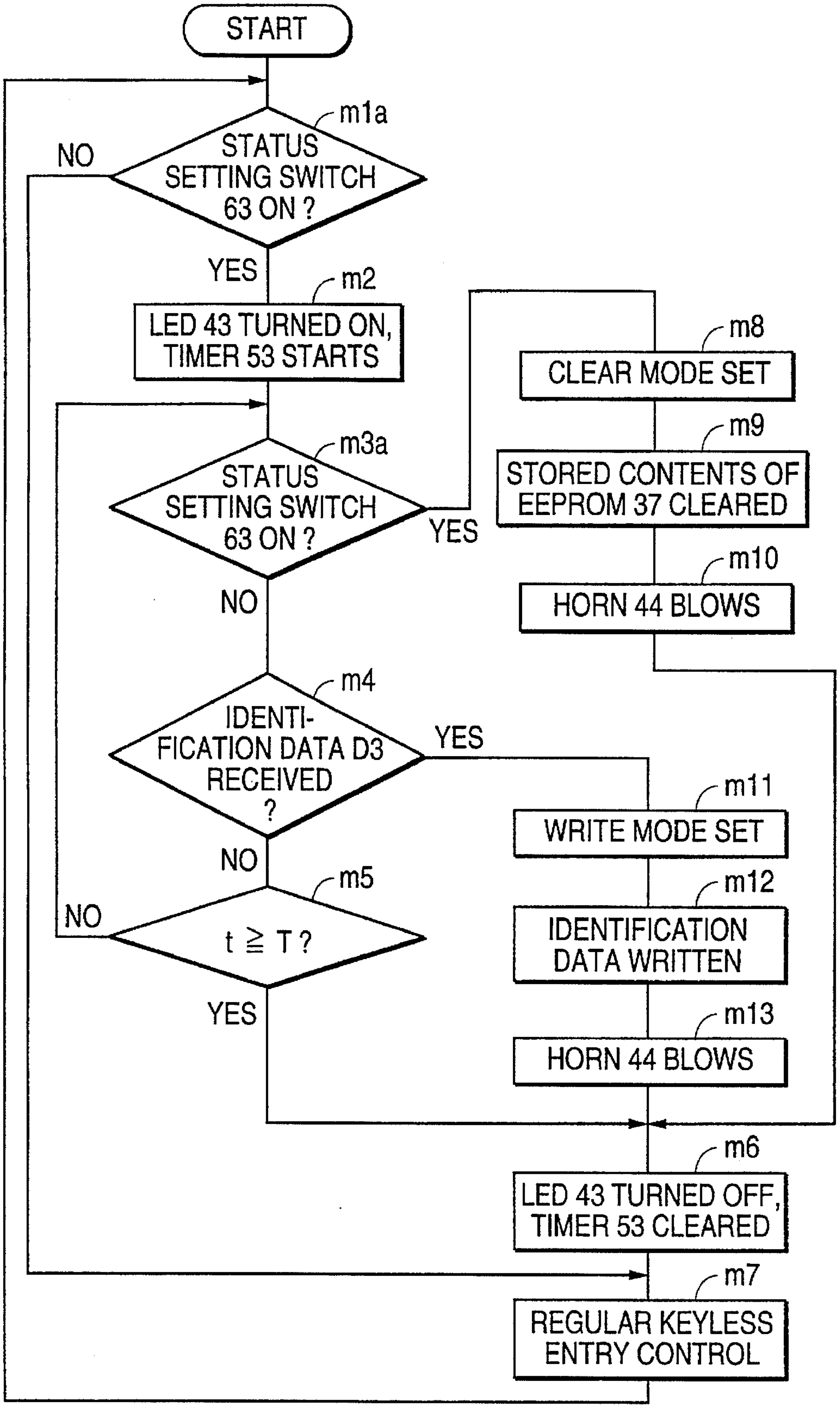
FIG. 12 is a flow chart that explains the operation of the receiver 61, FIG. 13 i a block diagram that shows the construction of a receiving apparatus 70, which is yet another example of the invention, FIGS. 14(1) to 14(4) form a drawing that explains the storing status of an EEPROM 72.

FIG. 12 is a flow chart that explains the operation of receiver 61, and the same reference numbers are used for parts that correspond to the previous FIG. 10. Since as before, the two switches 54*a* and 54*b* are replaced with a single status setting switch 63, step m1 which is indicated in FIG. 10 is replaced with step m1*a* of FIG. 12, and becomes the determination of whether or not the status setting switch 63 has been operated once. Further, the determination of the operation for switch 54*b* at step m3 of the FIG. 10, is replaced with the determination of whether or not the second operation of the status setting switch 63 has been performed at step m3*a* in FIG. 12. The other processing operations are the same a the processing shown in FIG. 10, and are omitted here.

Based on the above receiver 61, since the two operation switches 54*a* and 54*b* used in receiver 51 are combined in the common status setting switch 63, the space occupied by the status setting switch 63 in the apparatus is reduced together with a curtailment of the number of parts.

Further, for all of the switches 54*a*, 54*b*, and 63, momentary switches may be used.

Figure 13:
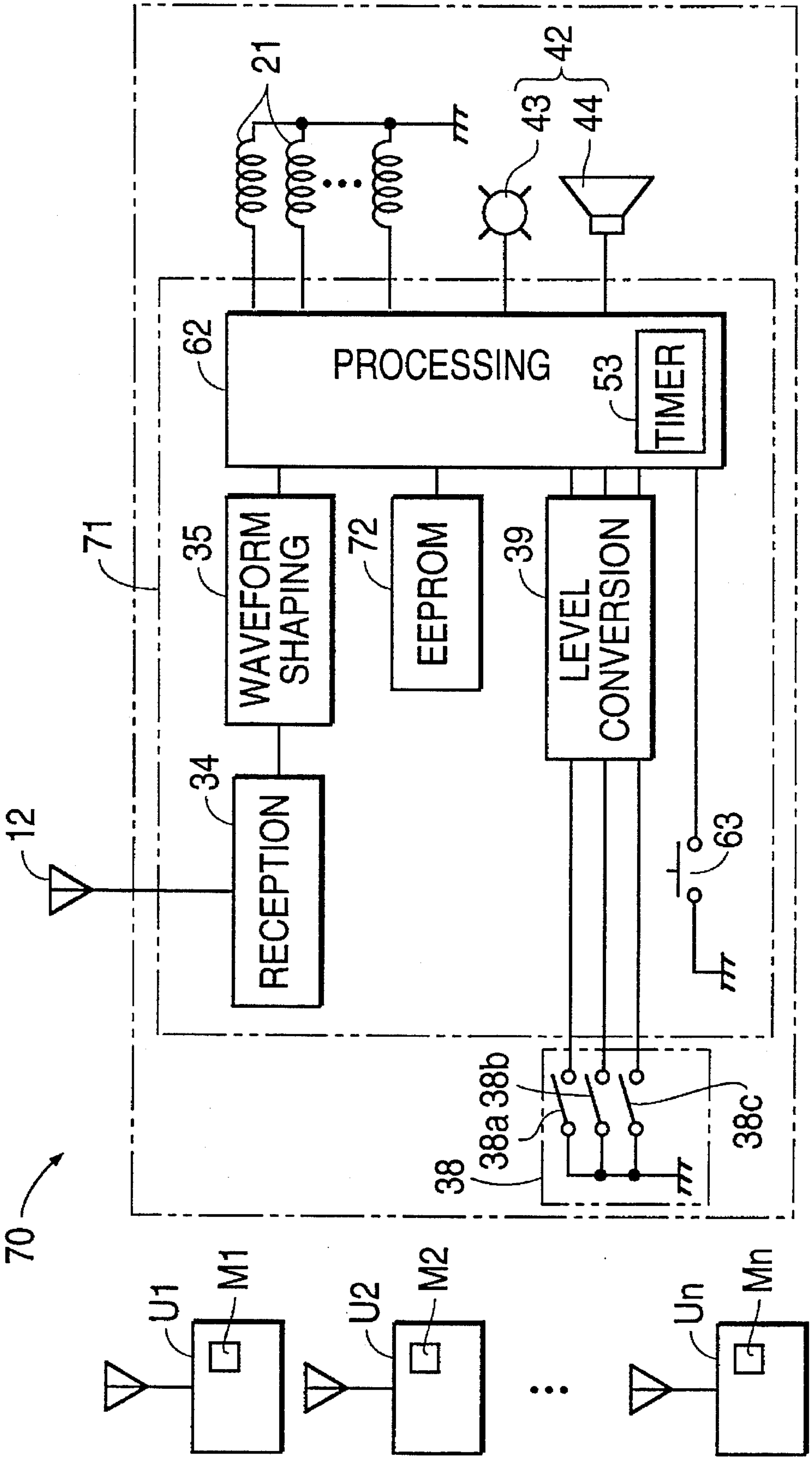

FIG. 13 is a block diagram that shows the construction of a receiver apparatus 70, which is yet another example of the invention, and the same reference numbers are used for parts which correspond to the previous example. In this example, a number of transmitters (indicated as "n" in the example) are provided, and it is supposed in this case that mutually different identification data R1 through Rn (indicated by the reference number "R" when generalized below) are stored in the ROM's M1 through Mn of the receivers U1 through Un (indicated by the reference number "U" when generalized below).

In a case such as this where a number of transmitters U are provided, it is necessary for all of the identification data R1 through Rn, which is assigned to the transmitters U, to be registered in an EEPROM 72 of a receiver 71, so that any of the transmitters U can perform the keyless entry control.

The interior of the EEPROM 72 is divided into a number of storage areas. In this example, as one illustration it is supposed that it has been divided into "k" areas, and it is possible to write and register "k" sets of identification data R. In this example the registration order is established so that in the case of registering identification data R which exceeds the number of areas k, priority is given to the most recently registered identification data.

FIG. 14 is a drawing that explains the storing status of the EEPROM 72. There are k storage areas for which the reference numbers M1 through Mk are given. FIG. 14 (1) shows the condition of the first identification data R1 registered in the storage area M1. Continuing, when the status setting switch 63 etc. is operated so that the identification data R2 will be registered, as is shown in FIG. 14 (2), the identification data R1 which was registered in the storage area M1 is shifted to the adjacent storage area M2, and then the new identification data R2 which is to be registered, is written and registered into the storage area M1 that has been cleared.

Thereafter in the same way, with each new registration, the previously registered identification data R is shifted consecutively to the adjacent storage area. In this way, when k sets of identification data are registered, as is shown in FIG. 14(3), identification data R is registered respectively in all of the k number of storage areas M1 through Mk.

Furthermore, in the case when new identification data R (k+1) is registered, the identification data R1, which was registered the earliest, is cleared from the last storage area Mk, as is shown in FIG. 14(4). After that, the data are shifted in sequence as stated above, and the newest identification data R (k+1) is written and registered into the storage area M1. In this way, it is constructed so that identification data can be registered into EEPROM 72 while giving priority to the newest data.

FIG. 15 is a flow chart that explains the replacement operation for registered contents as mentioned above. When the replacement processing begins, the stored contents in the last storage area Mk are cleared at step a1. That is to say, the identification data which was entered the earliest and which has been shifted to the last storage area Mk, is cleared. At step a2, the stored content of the storage area M(k–1) is shifted to the adjacent storage area Mk which has been cleared, and thereafter the shifting process is sequentially repeated. After that at step ak, the stored contents of the first storage area M1 is shifted, and in this way the identification data to be newly registered secures the storage area M1 in which it should be registered, and the replacement processing of the stored contents is completed.

Figure 16A:
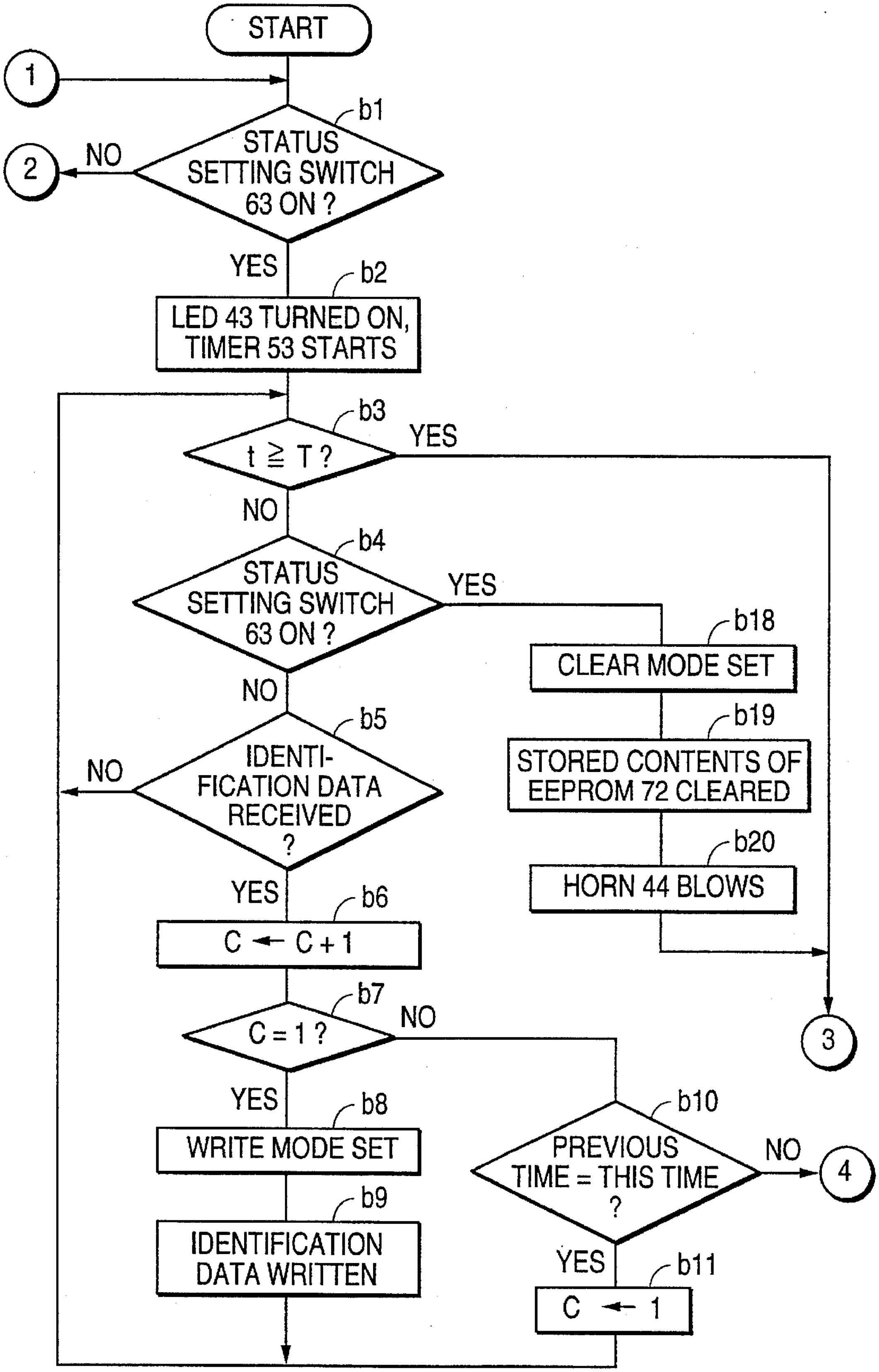
Figure 16B:
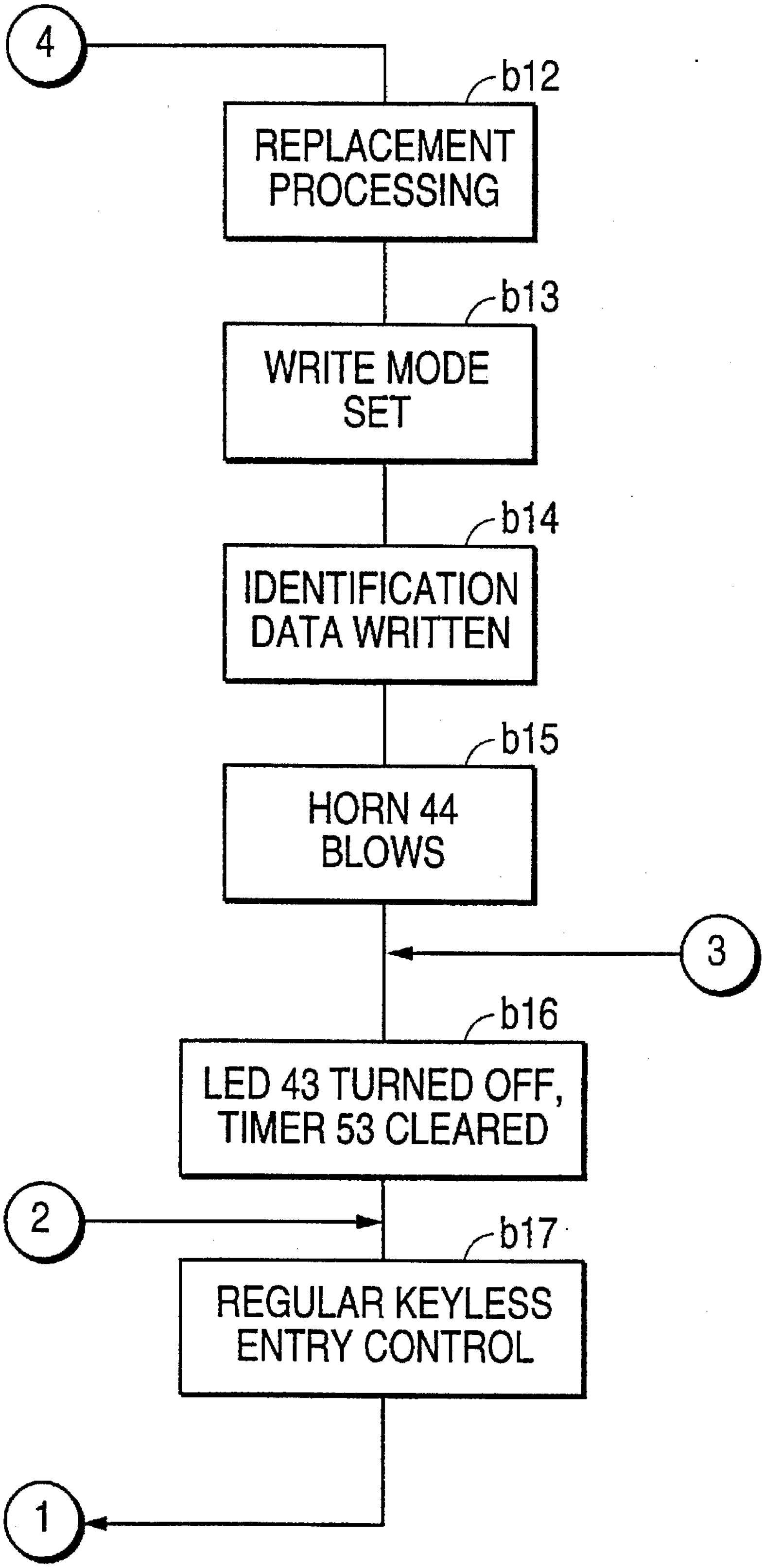

FIG. 16 is a flow chart that explains the operation of receiver 71. At step b1, it is determined whether or not the operation of the status setting switch 63 has been performed for the first time, and when it has not been operated, it proceeds to step b17, the above mentioned regular keyless entry control is performed, and step b1 is executed again. On the other hand, if the determination is affirmative, the processing proceeds to step b2, the EEPROM 72 is set to the writable status, and together with the lighting or flashing of the LED 43, the counting of timer 53 starts, and at step b3 it is determined whether or not the count value t has exceeded the preset value T.

In case the determination is negative, it proceeds to step b4 and it is determined whether or not the second operation of the status setting switch 63 has been performed. In case the determination at the step b4 is negative, the processing proceeds further to step b5 and it is determined whether or not the identification data R to be registered has been received. In case the determination is negative, the processing returns again to step b3 where the determination of the count value t and the preset value T is performed, and the processing of steps b3 through b5 is repeated.

When the identification data R to be registered is received at the step b3, it is preset into the processing circuit 62 at step b6, +1 is added to replace "0" as the count value C of a receiving counter, and at step b7 it is determined whether or not the count value C is "1". In case the count value C is "1", it proceeds to step b8 where the processing circuit 62 is set to the write mode, the received identification data R is written to the EEPROM 72 at step b9, and the processing returns again to step b3.

In general, the identification data R which is sent from a transmitter U is sent a number of times at the same level, and the construction is such that at the receiver 71, the identification data R can be evaluated and registered with certainty. Therefore, in case the count value C is not "1" at the step b7 while the processing of the steps b3 through b7 is being repeated, the processing proceeds to step b10. At step b10, it is determined whether or not the identification data R received this time is the same as the identification data R received the previous time, and when it is, the count value C at step b11 is newly set to "1", the processing returns to step b3, and the processing of the above steps b3 through b7, b10 and b11 is repeated.

When it is determined at the step b10, that the identification data R received this time is different than the identification data R registered in the EEPROM 72 the previous time, it proceeds to step b12 where the replacement processing shown in the above mentioned FIG. 16 is performed, and secures the first storage area M1 in a writable status. At step b13, the EEPROM 72 is set to the write mode, and the new identification code data R is written to the storage area M at step b14.

After that, the horn 44 is blown once at step b15, and at step b16 the writable status of the EEPROM 72 is released, and together with the turning off the LED 43, the count value t of timer 53 is cleared. As a result, the processing circuit 62 performs regular keyless entry control at step b17, and the processing returns again to step b1.

On the other hand, when at the step b3, the count value t of timer 53, from the point of the first operation of the status setting switch 63, exceeds the preset value T, the processing proceeds to step b16 and the writable status of the EEPROM 72 is automatically released.

Furthermore, at the step b4, when the second operation of the status setting switch 63 is performed before the count value t of the timer 53 reaches the value T, it moves to step b18 where the processing circuit 62 is set to the clear mode, all of the stored contents of the EEPROM 72 are cleared at step b19, reporting is performed by blowing the horn 44 twice at step b20, and then processing proceeds to step b16.

Therefore according to the above example, operability is markedly improved, because it is constructed so that in registering to the EEPROM 72, greater priority is given to the most recently registered identification data, than to the earliest registered identification data, which can be considered to be less in demand.

Therefore based upon the above example, it is possible to greatly simplify the control and registering of the identification data R from the transmitters U to the receiver 71 at the manufacturing stage. Also for example, even in the case where a transmitter is lost and a transmitter with new identification data is procured, maintenance is simple because write registration of the new identification data to the receiver can be carried out easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for remotely controlling an automotive vehicle provided with a transmitting apparatus, having a transmission button, for repeatedly transmitting a communication data which includes a synchronization data and an identification data upon manipulation of the transmission button, and a theft preventing apparatus for controlling respective parts of the vehicle upon receipt of the communication data transmitted from the transmitting apparatus, said control apparatus comprising:

means for discriminating whether the synchronizing data and the identification data included in the received communication data respectively match prestored synchronizing data and prestored identification data stored in a memory in advance;

means for controlling a locking and unlocking of doors of the vehicle when the discrimination means discriminates that synchronizing data and the identification data respectively match the prestored synchronizing data and prestored identification data;

means for determining whether continuous reception of the communication data has been effected in which the communication data is continuously repeatedly received for more than a predetermined period of time; and means for actuating an alarming theft prevention apparatus provided in the vehicle when the determining means determines that the continuous reception has been effected, the determining means setting a respective determination basis for each of the synchronization data and the identification data, each determination basis defining a degree of coincidence between received and prestored data, repeatedly comparing the synchronization data and the identification data included in the communication data with the prestored synchronization data and the prestored identification data, respectively, and determining that the continuous reception of the communication data has been effected when the determination basis of the synchronization data and the determination basis of the identification data are each satisfied during the predetermined period of time.

* * * * *